United States Patent
Middlebrook

[15] 3,678,134
[45] July 18, 1972

[54] BLEND OF ETHYLENE-BUTENE COPOLYMER WITH BUTADIENE-STYRENE RADIAL BLOCK COPOLYMER

[72] Inventor: Terence C. Middlebrook, Bartlesville, Okla.

[73] Assignee: Phillips Petroleum Company

[22] Filed: March 8, 1971

[21] Appl. No.: 122,238

[52] U.S. Cl. .................. 260/876 B, 260/88.2 R, 260/879, 260/880 B
[51] Int. Cl. ..................................................... C08f 29/12
[58] Field of Search ............................................. 260/876 B

[56] References Cited

UNITED STATES PATENTS 2,935,109  5/1960  Railsback ........................ 152/347
3,123,583  3/1964  Howard et al. ...................... 260/45.5
3,281,383  10/1966  Zelinski et al. ...................... 260/23.7
3,459,831  8/1969  Luftglass et al. .................... 260/876 B
3,562,356  2/1971  Nyberg et al. ....................... 260/876 B

FOREIGN PATENTS OR APPLICATIONS 1,025,295  4/1966  Great Britain ........................ 260/876 B Primary Examiner—Samuel H. Blech
Assistant Examiner—John Seibert
Attorney—Young and Quigg

[57] ABSTRACT

Cured blends of ethylene, 1-butene copolymer with a radial block copolymer of butadiene and styrene in critical amounts have a higher tensile strength than either the ethylene, 1-butene copolymer or the radial block copolymer. A process is provided for producing such blends.

4 Claims, No Drawings

BLEND OF ETHYLENE-BUTENE COPOLYMER WITH BUTADIENE-STYRENE RADIAL BLOCK COPOLYMER

This invention relates to a cured blend of an ethylene, 1-butene copolymer and a radial block copolymer in critical portions such that the tensile strength of the blend is greater than that of either component alone.

More particularly, 200 to 1,000 parts of an ethylene, 1-butene copolymer containing 1½ to 6 weight percent of 1-butene when admixed with 100 parts of a radial block copolymer containing 55 to 85 parts by weight of butadiene and the remainder styrene has, when cured with a peroxy oxygen-containing compound, a higher tensile strength than either component of the blend taken by itself.

The invention resides in the composition of matter described above and in the process for producing it wherein the radial block copolymer is produced by polymerizing styrene with a butyllithium catalyst, and thereafter adding butadiene to produce a polymer containing 55 to 85 parts by weight of butadiene and the remainder styrene, and finally contacting the resulting polymer with a polyfunctional treating agent.

Each of the butadiene-styrene block polymers so prepared is a "living" polymer containing a terminal lithium atom. When contacted with a polyfunctional treating agent, several molecules of the block polymer are coupled together to form what is described in the art as a radial block copolymer. These are to be distinguished from linear block copolymers prepared by successive polymerizations of styrene and butadiene with a butyllithium catalyst which are shortstopped instead of being contacted with a polyfunctional treating agent.

Blends of linear block copolymers of the type just described with polyethylene (U.S. Pat. Nos. 3,459,830 and 3,459,831) have been shown by me to provide a tensile strength which varies roughly in proportion to the amount of polyethylene added to the linear block polymer composition. There is no critical range of proportions wherein the tensile strength of the blend is higher than that of either component of the blend.

British Pat. No. 1,025,295 describes the coupling of butadiene-styrene block copolymers with bi-functional treating agents so that two polymer chains are linked together, thus forming an essentially linear polymer. Although this patentee states that in practice this reaction appears to occur in such a way as to produce branched or star-shaped polymers, there are no data supporting this statement nor is it explicable that such a polymer would be formed by a coupling agent having only two functional groups. The patentee suggests combining such block polymers with polyethylene to improve the tensile strength and other properties. The addition of polyethylene to such a block polymer would be expected to increase its tensile strength in proportion to the amount of polyethylene added since the polyethylene has a higher tensile strength than the block polymer. It was, therefore, surprising when I found that blending an ethylene, 1-butene copolymer with a branched block copolymer in critical proportions produced a higher tensile strength than either component of the blend taken alone.

The ethylene, 1-butene copolymer component of the blend contains 1.5 to 6 weight percent of 1-butene, has a density of approximately 0.95, a weight average molecular weight of 110,000 to 250,000 and a ratio of weight average to number average molecular weight of 10 to 20. Such copolymers can be prepared by various methods now well known to those skilled in the art, for example, by the copolymerization of ethylene and 1-butene over a chromium oxide catalyst supported on silica, alumina or silica-alumina according to Hogan and Banks U.S. Pat. No. 2,825,721. Suitable conditions are a temperature within the range of 100°–500° F., a liquid hourly space velocity in the range of 0.1–20, and a pressure in the range of 100–700 pounds per square inch. The ethylene, 1-butene copolymers can also be prepared with the well known organometal type catalysts.

The radial block copolymer contains 55 to 85 parts by weight butadiene and the remainder styrene. The general method of preparing such polymer is now well known and is described, for example, in U.S. Pat. No. 3,281,383 to Zelinski and Hsieh. Typically, the styrene is polymerized first in the presence of a butyllithium catalyst, and this is followed by the addition of butadiene to produce a block copolymer having a terminal lithium atom. The block polymer thus formed is referred to as a "living" polymer due to the presence of the lithium atom at the end of the conjugated diene polymer block. The living polymer then can be reacted with a polyfunctional compound having at least three reactive sites capable of reacting with the carbon lithium bond of the living polymer. There is thus formed a branched block copolymer having three or more long block polymer branches extending from the nucleus, such polymers often being referred to in the art as radial polymers.

It is within the scope of the invention to produce the polymer blocks by several successive incremental additions of styrene and butadiene whereby each branch of the radial polymer contains a plurality of butadiene and/or styrene blocks.

In accordance with the invention, 200 to 1,000 parts of the described ethylene, 1-butene polymer are admixed with 100 parts of the described radial block copolymer and cured with 0.1 to 10 parts by weight of a peroxy oxygen-containing compound per 100 parts of said ethylene, 1-butene copolymer. Surprisingly, the tensile strength of the resulting blend is substantially higher than that of either component of the blend taken alone, as will be shown by the specific example hereinafter presented, whereas in a similar blend prepared from the above-described copolymer and a linear block copolymer, the tensile strength is roughly proportional to the amount of copolymer added and does not exceed the tensile strength of the copolymer taken by itself.

The peroxy oxygen-containing compounds which can be employed to cure the blends of this invention are organic and inorganic peroxides and hydroperoxides. The decomposition temperature of the peroxy oxygen-containing compound is advantageously above 260° F., the temperature employed in mixing the ethylene, 1-butene copolymer and rubbery branched block copolymer. It is also advantageous that the peroxy oxygen-containing compound be added last to the blends of this invention, while they are in a softened condition (fluxed) and after other desired ingredients such as stabilizers, plasticizers, and pigments have been added. This minimizes premature cross-linking. The resulting compositions can then be employed in plastics processing operations such as extrusion, injection molding, compression molding, rotational molding and sheet forming. During or after such operations, the compositions are cured by employing processing temperatures above the peroxy oxygen-containing compound decomposition temperature.

Specific examples of suitable peroxy oxygen-containing compounds are di-α-cumyl peroxide; t-butyl-α-cumyl peroxide; di-t-butyl peroxide; t-butyl-peroxybenzoate; 2,5-dimethyl-2,5bis(t-butylperoxy)hexane; 2,5-dimethyl-2,5-bis-(t-butylperoxy)-3-hexyne; di-sec-butyl peroxydicarbonate; 1,1-bis(t-butyl-peroxy)-3,3,5-trimethylcyclohexane; t-butyl peroxy(2-ethylhexanoate); diisobutyryl peroxide; diisononanoyl peroxide; dimethylphenyl-hydroperoxymethane; barium peroxide; and lead peroxide. Mixtures of peroxy oxygen-containing compounds can be employed.

The amount of peroxy oxygen-containing compound employed for the blends of this invention is not critical so long as adequate curing is obtained. Generally about 0.1 to about 10 parts by weight of the peroxy oxygen-containing compound are used per 100 parts by weight of the ethylene, 1-butene copolymer.

The blends of this invention can be prepared by any means which will provide an essentially homogeneous mixture of the polymers and the other recipe ingredients. For example, the polymers can be blended on a roll mill, in internal mixers such as a twin screw extruder, a Banbury mixer or a Brabender Plastograph. Such mixing is advantageously carried out above the softening point of the ethylene, 1-butene copolymer which is in the range of 275°–350° F.

Besides the unexpected improvement in tensile strength, elongation is excellent for the blends of this invention compared to the ethylene, 1-butene component alone. This makes for better processing characteristics. The compositions of this invention can be used for bottles for detergents, sheet, filament, and boilable food packaging and even for such articles as cabinets and appliances.

SPECIFIC EXAMPLE

An ethylene, 1-butene copolymer was prepared by contacting the monomers with a chromium oxide catalyst supported on silica at a temperature of 275° F., a residence time of about 70 to about 150 minutes and a pressure of 420 psig. The resulting copolymer was prepared to a concentration of 5–7 percent in an inert mixture of hydrocarbons as the diluent. The polymer was isolated from the diluent by steam stripping the reaction mixture. The resulting copolymer had a density of 0.95, a weight average molecular weight of about 170,000 and a ratio of weight average to number average molecular weight of about 15.

A radial block copolymer which was a blend of three reactor batches was produced by polymerizing 40 parts of styrene in 800 parts cyclohexane with 0.12, 0.11, and 0.10 parts of n-butyllithium catalyst, respectively, at a temperature which ranged from 155°–210° F. during polymerization. When the styrene was polymerized, 60 parts of butadiene were added and the polymerization continued to form a block copolymer. Then, 0.5 part of a liquid epoxidized polybutadiene, a multifunctional coupling agent having about 10 percent oxirane oxygen content was added to each reactor batch to produce a radial block copolymer containing about 60 parts by weight of butadiene and the remainder styrene.

Each reactor batch was charged with 1.5 parts of an antioxidant (2,6-di-tert-butyl-4-methylphenol). The batches were combined and the polymer recovered by steam stripping followed by drying in an extruder. The recovered polymer was a butadiene/styrene copolymer having a total styrene content by analysis of 38.5 per cent; a polystyrene content of 37.4 percent; an inherent viscosity of 1.45; and a Mooney viscosity (MS-4 at 270° F.) of 70.

The ethylene, butene-1 copolymer and radial block copolymer were blended on a roll mill at a temperature of 300° F. Variable amounts of 2,5-bis(t-butyl peroxy)-2,5-dimethylhexane were added on the mill as a cross-linking agent and the stock was cured at 240° F. for 30 minutes. The amount was selected to give the optimum cure, being 0.05 percent for the radial block polymer alone and varying between 0.4 and 0.8 part peroxide per 100 parts ethylene 1-butene copolymer for the other materials tested.

The tensile strength and elongation of the ethylene, butene-1 copolymer, the radial block copolymer and blends of the two in various proportions were determined. The results were as follows:

| Ethylene, 1-Butene Copolymer, Parts* | Tensile | Elongation |
| --- | --- | --- |
| 0 | 1760 | 480 |
| 50 | 3170 | 580 |
| 100 | 3500 | 490 |
| 200 | 4050 | 700 |
| 300 | 4480 | 700 |
| 400 | 4240 | 700 |
| 1000 | 4110 | 720 |
| All (no radial block copolymer) | 3900 | 860 |

*Per 100 parts radial block copolymer.

These data show that blends of 200 to 1,000 parts of the ethylene, 1-butene copolymer per 100 parts of radial teleblock polymer unexpectedly gave tensile strengths higher than either of the tensile strength of the radial teleblock polymer taken alone or of the tensile strength of the ethylene, 1-butene copolymer taken alone.

EXAMPLE II

A similar set of blends was prepared except that a linear block copolymer was utilized instead of the radial block copolymer. The peroxide was the same as that employed in Example I and was employed in the amount of 5 parts by weight per 100 parts by weight of the ethylene, 1-butene copolymer. The linear block copolymer had a total styrene content of 40 percent; total butadiene content of 60 percent; polystyrene content of 30 percent; Mooney viscosity (MS-4 at 212° F.) of 80; and an inherent viscosity of 1.39. The results were as follows:

| Ethylene, 1–Butene Copolymer, Parts By Weight | Linear Block Copolymer, Parts by Weight | Tensile, psi | Elongation, Per Cent |
| --- | --- | --- | --- |
| 100 | — | 3550 | 550 |
| 90 | 10 | 3400 | 400 |
| 80 | 20 | 2600 | 280 |
| 75 | 25 | 2900 | 170 |
| 70 | 30 | 2350 | 360 |
| 65 | 35 | 2850 | 540 |
| 50 | 50 | 2700 | 340 |
| — | 100 | 1450 | 210 |

Thus, in the case of blends of the claimed ethylene, 1-butene copolymer with linear, rather than radial teleblock, polymers, the tensile strength was in no case higher than that of the copolymer taken by itself and was, in fact, roughly proportional to the amount of copolymer employed in the blend.

That which is claimed is:

1. A composition of matter consisting of a blend of
   a. 200 to 1,000 parts of an ethylene, 1-butene copolymer containing 1½ to 6 weight percent of 1-butene, said copolymer having a density of approximately 0.95, a weight average molecular weight of 110,000 to 250,000 and a ratio of weight average to number average molecular weight of 10 to 20 with
   b. 100 parts of a radial block copolymer containing 55 to 85 parts by weight of butadiene and the remainder styrene, and
   c. a peroxy oxygen-containing compound in an amount sufficient to cure the blend, and
said blend having a higher tensile strength than either of said ethylene, 1-butene copolymer or said radial block copolymer.

2. The composition of claim 1 wherein the curing compound is 0.1 to 10 parts of a peroxide or hydroperoxide per 100 parts of ethylene, 1-butene copolymer.

3. A process for producing a high tensile strength polymer blend which comprises blending
   a. 200 to 1,000 parts of an ethylene, 1-butene copolymer containing 1½ to 6 weight percent of 1-butene, said copolymer having a density of approximately 0.95, a weight average molecular weight of 10 to 20 with
   b. 100 parts of a radial polymer prepared by polymerizing styrene with a butyl-lithium catalyst and thereafter adding butadiene to produce a polymer containing 55 to 85 parts by weight of butadiene and the remainder styrene, and finally contacting the resulting polymer with a polyfunctional treating agent having at least three reactive sites
   c. at a temperature above the softening point of the ethylene, 1-butene copolymer, and
   d. curing the blend with a peroxy oxygen-containing compound.

4. The process of claim 3 wherein the curing compound is a peroxide or hydroperoxide added in an amount of 0.1 to 10 parts per 100 parts of ethylene, 1-butene copolymer.

* * * * *

UNITED STATES PATENT OFFICE

CERTIFICATE OF CORRECTION

Patent No. 3,678,134      Terence C. Middlebrook      Dated: July 18, 1972

It is certified that error appears in the above-identified patent and that said Letters Patent are hereby corrected as shown below:

Column 4, line 58, after "weight of" and before "10 to 20" insert --- 110,000 to 250,000 and a ratio of weight average to number average molecular weight of ---.

Signed and sealed this 2nd day of January 1973.

(SEAL)
Attest:

EDWARD M. FLETCHER, JR.               ROBERT GOTTSCHALK
Attesting Officer                       Commissioner of Patents